US012587828B2

(12) United States Patent
Krishne Gowda et al.

(10) Patent No.: US 12,587,828 B2
(45) Date of Patent: Mar. 24, 2026

(54) MANAGING MULTIPLE SUBSCRIBER IDENTITIES IN CELLULAR NETWORK

(71) Applicant: Nokia Solutions and Networks Oy, Espoo (FI)

(72) Inventors: Kishore Krishne Gowda, Bangalore (IN); Nandagopal Peethambaran Nair Rajalakshmi, Bangalore (IN); Sharath Raveendran, Bangalore (IN); Jitendra Kumar Saini, Bangalore (IN); Sambhram Kanavalli, Bangalore (IN); Nanda Kumar, Bangalore (IN); Frank Frederiksen, Klarup (DK); Jakob Lindbjerg Buthler, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 549 days.

(21) Appl. No.: 18/005,128

(22) PCT Filed: Jun. 17, 2021

(86) PCT No.: PCT/FI2021/050462
§ 371 (c)(1),
(2) Date: Jan. 11, 2023

(87) PCT Pub. No.: WO2022/013481
PCT Pub. Date: Jan. 20, 2022

(65) Prior Publication Data
US 2023/0262563 A1      Aug. 17, 2023

(30) Foreign Application Priority Data
Jul. 17, 2020    (FI) ..................................... 20205757

(51) Int. Cl.
*H04W 8/20*        (2009.01)
*H04W 8/18*        (2009.01)
(Continued)

(52) U.S. Cl.
CPC ......... *H04W 8/20* (2013.01); *H04W 36/0069* (2018.08); *H04W 36/385* (2013.01); *H04W 88/06* (2013.01)

(58) Field of Classification Search
CPC ......... H04W 8/18; H04W 8/20; H04W 36/00; H04W 36/38; H04W 88/06
See application file for complete search history.

(56) References Cited

U.S. PATENT DOCUMENTS

| | | | |
|---|---|---|---|
| 8,121,601 B2 | 2/2012 | Huang et al. | |
| 8,457,635 B2 | 6/2013 | Bachmann et al. | |

(Continued)

FOREIGN PATENT DOCUMENTS

| | | |
|---|---|---|
| CN | 110710237 A | 1/2020 |
| CN | 111277999 A | 6/2020 |

(Continued)

OTHER PUBLICATIONS

Extended European Search Report received for corresponding European Patent Application No. 21843315.9, dated Jul. 1, 2024, 10 pages.

(Continued)

*Primary Examiner* — Jenee Holland
(74) *Attorney, Agent, or Firm* — Barta Jones, PLLC

(57) ABSTRACT

This document discloses a solution for sharing information on subscriber identifiers in a network. According to an aspect, a method comprises: storing, in a mobility management node, at least two subscriber identifiers; and transmitting, by the mobility management node to a target network node during setup of a bearer for a first subscriber identifier of the at least two subscriber identifiers, a message comprising at least a second subscriber identifier of the at least two subscriber identifiers.

8 Claims, 6 Drawing Sheets

(51) Int. Cl.
    *H04W 36/00*     (2009.01)
    *H04W 36/38*     (2009.01)
    *H04W 88/06*     (2009.01)

(56)          References Cited

U.S. PATENT DOCUMENTS

| | | | |
|---|---|---|---|
| 8,718,688 B2 | 5/2014 | Shaheen et al. | |
| 8,818,356 B2 | 8/2014 | Young et al. | |
| 11,395,130 B2 | 7/2022 | Sabouri-Sichani et al. | |
| 2012/0021744 A1 | 1/2012 | Chin et al. | |
| 2012/0155428 A1 | 6/2012 | Bovo et al. | |
| 2013/0303203 A1 | 11/2013 | Wang et al. | |
| 2015/0065106 A1* | 3/2015 | Catovic | H04W 88/06 |
| | | | 455/418 |
| 2015/0237597 A1 | 8/2015 | Kanamarlapudi et al. | |
| 2015/0282017 A1 | 10/2015 | Wang et al. | |
| 2016/0183156 A1 | 6/2016 | Chin et al. | |
| 2017/0127217 A1* | 5/2017 | Miao | H04W 76/15 |
| 2019/0037531 A1 | 1/2019 | Pantus et al. | |
| 2019/0350027 A1* | 11/2019 | Centonza | H04W 76/16 |
| 2020/0068647 A1* | 2/2020 | Jha | H04W 60/005 |
| 2021/0044964 A1* | 2/2021 | Lindheimer | H04W 8/26 |
| 2022/0053355 A1* | 2/2022 | Stjernholm | H04W 48/08 |
| 2022/0295264 A1* | 9/2022 | Hong | H04W 76/20 |
| 2023/0093965 A1* | 3/2023 | Velev | H04W 68/12 |
| | | | 455/458 |
| 2023/0232296 A1* | 7/2023 | Hong | H04W 36/08 |
| | | | 455/438 |
| 2024/0244496 A1* | 7/2024 | Krishne Gowda | |
| | | | H04W 36/0055 |
| 2024/0430755 A1* | 12/2024 | Talebi Fard | H04W 36/0033 |

FOREIGN PATENT DOCUMENTS

| | | | |
|---|---|---|---|
| EP | 2605563 A1 | 6/2013 | |
| WO | 2012/138141 A2 | 10/2012 | |
| WO | 2015/180126 A1 | 12/2015 | |
| WO | 2015/180779 A1 | 12/2015 | |
| WO | 2016/118248 A1 | 7/2016 | |
| WO | 2017/012228 A1 | 1/2017 | |
| WO | 2017/027115 A1 | 2/2017 | |
| WO | 2018/141148 A1 | 8/2018 | |

OTHER PUBLICATIONS

"KI #1, New Sol: Network-based paging filtering", SA WG2 Meeting #139E, S2-2004589, Agenda : 8.10, LG Electronics, Jun. 1-12, 2020, 4 pages.

"K##2: New solution: Resolving paging conflict using MUSIM Assistance Information", SA WG2 Meeting #139E, S2-2004601, Agenda : 8.10, Nokia, Jun. 1-12, 2020, 6 pages.

"KI#3 New Solution: Coordinated Leaving Using Musim Assistance Information", SA WG2 Meeting #139E, S2-2003767, Agenda : 8.10, Nokia, Jun. 1-12, 2020, 3 pages.

"Inter-system direct forwarding with shared SgNB/gNB", 3GPP TSG-RAN WG3 #106, R3-197144, Agenda : 31.3.3 , Samsung, Nov. 18-22, 2019, 7 pages.

Extended European Search Report received for corresponding European Patent Application No. 21842242.6, dated Jul. 15, 2024, 10 pages.

"On the paging area management for light connection", 3GPP TSG-RAN WG2 Meeting #95, R2-165258, Agenda item: 8.9.1, ASUSTeK, Aug. 22-26, 2016, 3 pages.

"Revised SID: Study on system enablers for multi-SIM devices", TSG SA Meeting #SP-83, SP-190248, Agenda: 17B.19, SA WG2, Mar. 20-22, 2019, 4 pages.

"New Rel-17 SID proposal: Study on multi-SIM devices in RAN", 3GPP TSG RAN Meeting #83, RP-190282, Agenda: 9.1.2, vivo, Mar. 18-21, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Service requirements for Machine-Type Communications (MTC); Stage 1 (Release 15)", 3GPP TS 22.368, V15.0.0, Jul. 2019, pp. 1-26.

"3rd Generation Partnership Project; Technical Specification Group Radio Access Network; NG-RAN; Xn application protocol (XnAP) (Release 16)", 3GPP TS 38.423, V16.0.0, Dec. 2019, pp. 1-330.

"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0, Dec. 2019, pp. 1-964.

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.5.0, Dec. 2019, pp. 1-55.

"3rd Generation Partnership Project; Technical Specification Group Radio Access Network; Evolved Universal Terrestrial Radio Access Network (E-UTRAN); S1 Application Protocol (S1AP) (Release 16)", 3GPP TS 36.413, V16.1.0, Mar. 2020, pp. 1-391.

"3rd Generation Partnership Project; Technical Specification Group Radio Access Network; NG-RAN; NG Application Protocol (NGAP) (Release 16)", 3GPP TS 38.413, V16.1.0, Mar. 2020, pp. 1-341.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.0.0, Mar. 2020, pp. 1-58.

"LTE; Evolved Universal Terrestrial Radio Access Network (E-UTRAN); Architecture description (3GPP TS 36,401 version 8.6.0 Release 8)", ETSI TS 136 401, V8.6.0, Jul. 2009, pp. 1-20.

Tayyab et al., "A Survey on Handover Management: From LTE to NR", IEEE Access, vol. 7, Aug. 26, 2019, pp. 118907-118930.

Office action received for corresponding Finnish Patent Application No. 20205753, dated Mar. 9, 2021, 7 pages.

Office action received for corresponding Finnish Patent Application No. 20205757, dated Mar. 18, 2021, 7 pages.

International Search Report and Written Opinion received for corresponding Patent Cooperation Treaty Application No. PCT/FI2021/050461, dated Sep. 29, 2021, 16 pages.

"3rd Generation Partnership Project; Technical Specification Group Services and System Aspects; Study on system enablers for devices having multiple Universal Subscriber Identity Modules (USIM) (Release 17)", 3GPP TR 23,761, V0.4.0, Jun. 2020, pp. 1-78.

International Search Report and Written Opinion received for corresponding Patent Cooperation Treaty Application No. PCT/FI2021/050462, dated Oct. 5, 2021, 16 pages.

"3rd Generation Partnership Project; Technical Specification Group Services and System Aspects; Procedures for the 5G System (5GS); Stage 2 (Release 16)", 3GPP TS 23.502, V16.5.0, Jul. 2020, pp. 1-594.

* cited by examiner

MOBILITY
MANAGEMENT
NODE 200

MOBILITY
MANAGEMENT
NODE 202

900: TRIGGER INTER-MMN S1/NG HANDOVER

902 FORWARD RELOCATION REQUEST FOR SID1 (SID2)

904 FORWARD RELOCATION RESPONSE

START

1000: DETECT PAGING OF SID2

NO                    1002: SID2 IN 410?                    YES

1004: PAGE FOR SID2 IN WIDER AREA          1006: PAGE FOR SID2 IN SMALLER AREA

END

MOBILITY
MANAGEMENT
NODE 200

ACCESS
NBODE 104

1100: TRIGGER ACQUISITION OF MUSIM INFO

1102 LOCATION REPORTING CONTROL (SID1, MUSIM INFO)

1104 LOCATION REPORT (SID2)

14 SUBSCRIBER
IDENTIFIER MANAGER

15 SID DISTRIBUTOR

16 SID COLLECTOR

18 PROCEDURE
OPTIMIZER

20
MEMORY

24: SOFTWARE

26: CONF DB

22
I/O

12
NAS/RRC CONTROLLER

10 COMMUNICATION CONTROLLER

21
TX/RX

MANAGING MULTIPLE SUBSCRIBER IDENTITIES IN CELLULAR NETWORK

RELATED APPLICATION

This application was originally filed as PCT Application No. PCT/FI2021/050462, filed on Jun. 17, 2021, which claims priority from FI application No. 20205757, filed on Jul. 17, 2020, each of which is incorporated herein by reference in its entirety.

FIELD

Various embodiments described herein relate to the field of cellular communications and, particularly, to radio access network operations related to terminal devices having multiple subscriber identities.

BACKGROUND

Terminal devices or user equipment (UE) of cellular communication systems have been capable of supporting multiple subscriber identities for a long time. A subscriber identity is typically realized by a subscriber identifier such as International Mobile Subscriber Identity (IMSI) or a unique subscription permanent identifier (SUPI). The subscriber identifier may be stored in a universal subscriber identity module (USIM) or a similar module. This module may comprise of hardware and/or software components. A terminal device may operate multiple subscriber identities in parallel and independently, depending on the hardware and/or or software configuration of the terminal device. Some (even a plurality) of the subscriber identities may have an active radio resource connection in operation while some of the subscriber identities may be in an idle state.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a mobility management node controlling a plurality of access nodes, comprising means for performing: storing at least two subscriber identifiers; and transmitting, to a target network node during setup of a bearer for a first subscriber identifier of the at least two subscriber identifiers, a message comprising at least a second subscriber identifier of the at least two subscriber identifiers.

In an embodiment, the means are configured to receive, from an access node of the plurality of access nodes, a handover request message requesting a handover procedure for the first subscriber identifier and to transmit the message in response to the handover request message, wherein the setup of the bearer is a part of the handover procedure.

In an embodiment, the access node is a first access node controlled by the apparatus and the target network node is a second access node controlled by the apparatus.

In an embodiment, said mobility management node is a first mobility management node, and wherein the target network node is a second mobility management node different from the first mobility management node.

In an embodiment, the handover message is a further handover request message addressed to the target network node.

In an embodiment, the means are configured to: receive, before said setup of the bearer has been initiated, from the target network node a setup message comprising at least one information element indicating whether or not the target network node accepts information on multiple subscriber identifiers; transmit the message in response to the setup message indicating that the target network node accepts the information on multiple subscriber identifiers.

In an embodiment, the message further comprises at least one equipment identifier and information mapping the first identifier and the at least second identifier to the at least one equipment identifier.

According to an aspect, there is provided an apparatus for a network node, comprising means for performing: receiving, from a mobility management node controlling a plurality of access nodes, a message during setup of a bearer for a first subscriber identifier, the message comprising at least a second subscriber identifier different from the first subscriber identifier; storing the first subscriber identifier and the second identifier; and performing at least one procedure using the second identifier.

In an embodiment, the message is a handover message.

In an embodiment, the network node is an access node, and wherein the means are configured to setup the bearer between the access node and the mobility management node.

In an embodiment, the mobility management node is a first mobility management node and the network node is a second mobility management node different from the first mobility management node, and wherein the means are configured to setup the bearer between the second mobility management node and an access node controlled by the second mobility management node.

In an embodiment, the means are configured to: transmit, to the mobility management node before said setup of the bearer has been initiated, a setup message comprising at least one information element indicating whether or not the apparatus accepts information on multiple subscriber identifiers; and receive the message in response to indicating that the apparatus accepts the information on multiple subscriber identifiers.

In an embodiment, the means comprise at least one processor and at least one memory including computer program code, wherein the at least one memory and computer program code are configured, with the at least one processor, to cause the performance of the apparatus.

According to an aspect, there is provided a method comprising: storing, in a mobility management node, at least two subscriber identifiers; and transmitting, by the mobility management node to a target network node during setup of a bearer for a first subscriber identifier of the at least two subscriber identifiers, a message comprising at least a second subscriber identifier of the at least two subscriber identifiers.

In an embodiment, the mobility management node receives, from an access node of the plurality of access nodes, a handover request message requesting a handover procedure for the first subscriber identifier and transmits the message in response to the handover request message, wherein the setup of the bearer is a part of the handover procedure.

In an embodiment, the access node is a first access node controlled by the mobility management node and the target network node is a second access node controlled by the mobility management node.

In an embodiment, said mobility management node is a first mobility management node, and wherein the target network node is a second mobility management node different from the first mobility management node.

In an embodiment, the handover message is a further handover request message addressed to the target network node.

In an embodiment, the mobility management node receives, before said setup of the bearer has been initiated, from the target network node a setup message comprising at least one information element indicating whether or not the target network node accepts information on multiple subscriber identifiers; and transmits the message in response to the setup message indicating that the target network node accepts the information on multiple subscriber identifiers.

In an embodiment, the message further comprises at least one equipment identifier and information mapping the first identifier and the at least second identifier to the at least one equipment identifier.

According to an aspect, there is provided a method comprising: receiving, by a network node from a mobility management node controlling a plurality of access nodes, a message during setup of a bearer for a first subscriber identifier, the message comprising at least a second subscriber identifier different from the first subscriber identifier; storing, by the network node, the first subscriber identifier and the second identifier; and performing, by the network node, at least one procedure using the second identifier.

In an embodiment, the message is a handover message.

In an embodiment, the network node is an access node that sets up the bearer between the access node and the mobility management node.

In an embodiment, the mobility management node is a first mobility management node and the network node is a second mobility management node different from the first mobility management node that sets up the bearer between the second mobility management node and an access node controlled by the second mobility management node.

In an embodiment, the network node transmits, to the mobility management node before said setup of the bearer has been initiated, a setup message comprising at least one information element indicating whether or not the network node accepts information on multiple subscriber identifiers; and receives the message in response to indicating that the network node accepts the information on multiple subscriber identifiers.

According to an aspect, there is provided a computer program product embodied on a computer-readable medium and comprising a computer program code readable by a computer, wherein the computer program code configures the computer to carry out a computer process comprising: storing, in a mobility management node, at least two subscriber identifiers; and transmitting, to a target network node during setup of a bearer for a first subscriber identifier of the at least two subscriber identifiers, a message comprising at least a second subscriber identifier of the at least two subscriber identifiers.

According to an aspect, there is provided a computer program product embodied on a computer-readable medium and comprising a computer program code readable by a computer, wherein the computer program code configures the computer to carry out a computer process comprising: receiving, from a mobility management node controlling a plurality of access nodes, a message during setup of a bearer for a first subscriber identifier, the message comprising at least a second subscriber identifier different from the first subscriber identifier; storing the first subscriber identifier and the second identifier; and performing at least one procedure using the second identifier.

LIST OF DRAWINGS

Embodiments are described below, by way of example only, with reference to the accompanying drawings, in which FIGS. 1 and 2 illustrate wireless communication scenarios to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the substantially same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figures 1, 2:
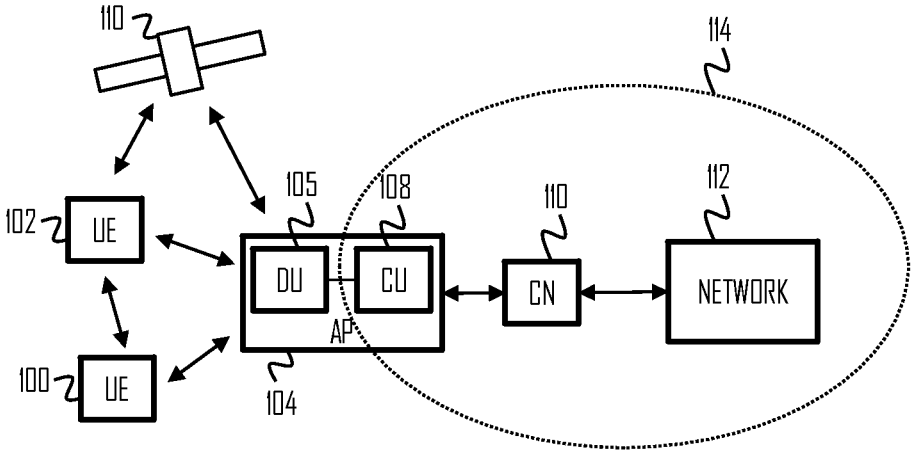

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 110 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

For fulfilling the need for improving the deployment and performance of communication systems, the concept of "plug-and-play" (e/g) NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

FIG. 2 illustrates a more detailed diagram of a radio access network of the system of FIG. 1. In the scenario of FIG. 2, a terminal device (UE) 100 is in proximity of multiple access nodes 104, 104A, 104B. Any one of the access nodes may serve the terminal device with a RRC connection (e.g. 210 provided by the access node 104 in FIG. 2). The serving access node may provide the terminal device with access to the cellular network, to a core network including a mobility management node 200, and to other networks via the RRC connection. The mobility management node 200 may perform access control and mobility control for the terminal device. For LTE systems, the mobility management node 200 may be the MME, while in 5G networks the mobility management node 200 may be an access and mobility management function (AMF). The mobility management node may connect with the terminal device via a non-access stratum connection, referring to that there is no direct radio connection (direct access) between the mobility management node and the terminal device, although the two communicate with one another. The interface between the access node and the mobility management node is called an S1 interface in the LTE systems and an NG interface in the 5G systems.

The other access nodes 104A, 104B, 104C may operate in the substantially same radio access network as the access node 104 and, as a consequence, are potential targets for a handover when the terminal device moves towards a cell edge of the access node 104. The access nodes may communicate with one another via a backhaul interface such as an Xn interface specified in specifications of a 3rd Generation Partnership Project (3GPP) for 5G. The backhaul interface may be used to negotiate the handover and transfer contextual parameters of the terminal device and the RRC connection, for example. The access node 104 has such an interface with the access node 104B but not with the access node 104A and 104C. Therefore, when the terminal device is handed over to the access node 104A, the handover may be carried out under the control of the mobility management node 200, and the handover may include a handover between the S1/NG interfaces in addition to the handover of the RRC connection (210 to 214). The S1/NG handover is internal to the mobility management node 200 because both access nodes 104 and 104A are under the control of the mobility management node 200. When the handover is from the access node 104 to the access node 104C, the handover may require a handover between mobility management nodes 200, 202 because the access node 104C is under the control of the mobility management node 202. Then, the handover may be negotiated between the mobility management nodes via an S10 (LTE) or NG14 (5G) interface. When the handover is from the access node 104 to 104B, the handover of the RRC connection (210 to 212) may be needed.

As described in Background, a terminal device may have multiple subscriber identities and corresponding subscriber identifiers. The terminal device may use cellular communication services via one or more subscriptions. A subscription may be bound to a universal subscriber identity module (USIM) and be identified by a unique subscription permanent identifier (SUPI) or international mobile subscriber identity (IMSI), depending on the cellular communication system. SUPI comprises a mobile country code (MCC), a mobile network code (MNC), and a mobile subscription identification number (MSIN). The terminal device may additionally have one or more equipment identifiers, depending on hardware of the terminal device. Examples of the equipment identifier are international mobile equipment identifier (IMEI) and a permanent equipment identifier (PEI). In an example, the terminal device may operate one connection with a cellular communication system via one subscriber identifier and one equipment identifier and, additionally, operate another connection with substantially the same or different cellular communication system via another subscriber identifier and the same or another equipment identifier. A subscriber identifier may be linked to an equipment identifier in a network node of a cellular communication system during a connection.

The connection(s) may comprise the RRC connection specified in 3GPP specifications, for example. The connection may be generally understood as a part of a cellular communication service established for the terminal device to gain access to the cellular communication system and to other communication networks. A terminal device with multiple subscriber identities (a MUSIM terminal device) may be registered to the cellular communication system and operate in any one of the RRC states (RRC_idle, RRC_inactive, or RRC_connected) with one or more subscription identities. When a network node of the cellular communication system is not aware that these multiple subscription identities are co-located in substantially the same terminal device, the network node may be unable to optimize certain procedures and, instead, may treat the subscription identifiers of the user terminal independently.

Figures 3, 4:
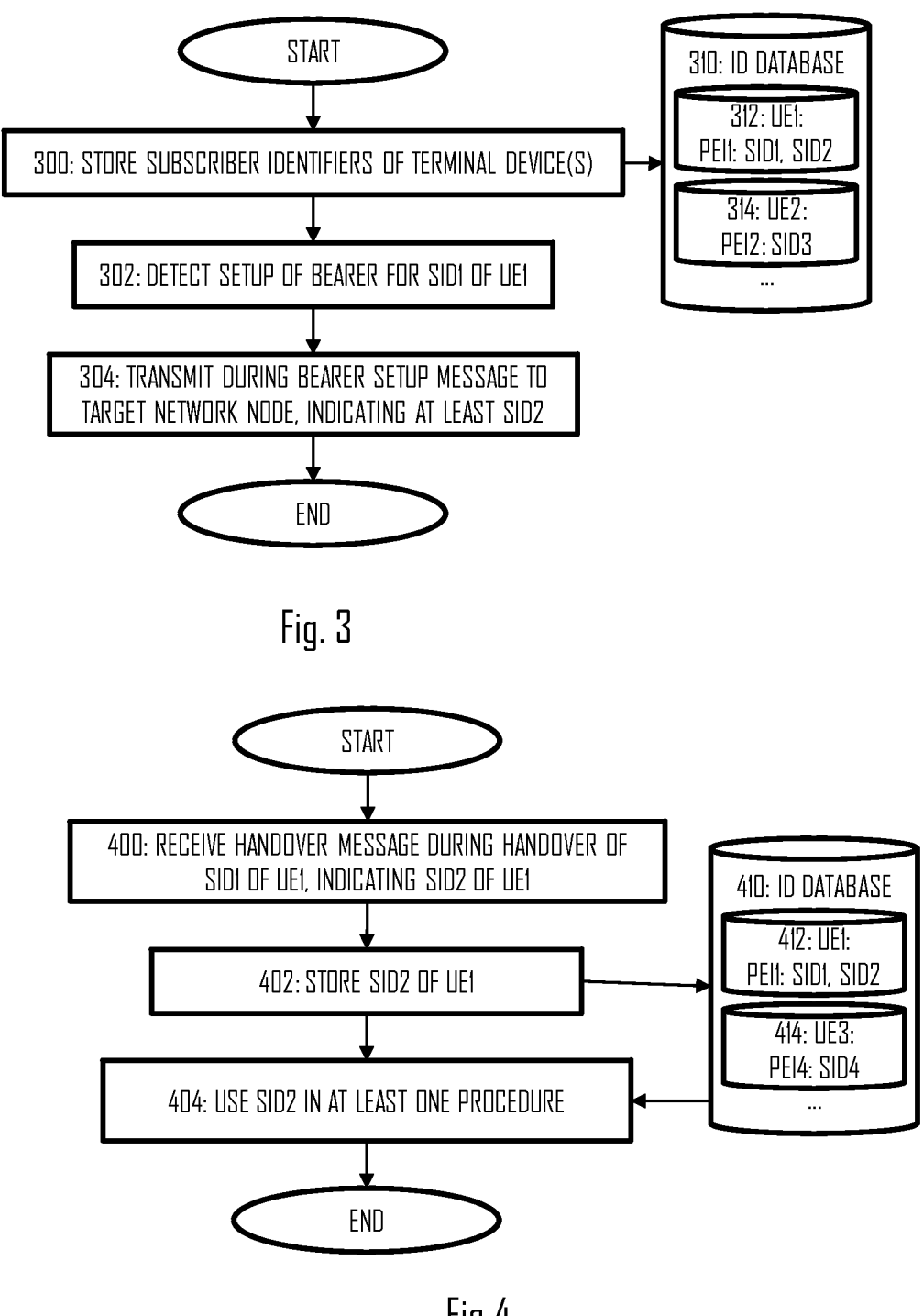
FIGS. 3 and 4 illustrate some embodiments for sharing multiple subscriber identifiers of a terminal device between network nodes.

FIGS. 3 and 4 illustrate some embodiments for sharing the information on the multiple subscriber identifiers of a terminal device between a mobility management node and another network node of the cellular communication system. In the embodiments, the information is shared during a handover procedure of the terminal device. FIG. 3 illustrates a process for the mobility management node controlling multiple access nodes, while FIG. 4 illustrates a process for a target network node. The target network node may be an access node of the cellular communication system or another mobility management node, as described in embodiments below.

Referring to FIG. 3, the process comprises: storing (block 300) at least two subscriber identifiers; and transmitting (block 304), to a target network node during setup (block 302) of a bearer for a first subscriber identifier of the at least two subscriber identifiers, a message comprising at least a second subscriber identifier of the at least two subscriber identifiers.

In an embodiment, the multiple subscriber identifiers are stored in a subscriber identifier database 310 stored in a memory of the mobility management node or in a repository accessible to the mobility management node. The database 310 may store a record 312 for the terminal device (UE1) and a similar record 314 for other terminal devices served by the mobility management node. The record 312 may store, in connection with the terminal device, one or more equipment identifiers (e.g. PEI1) of the terminal device and the multiple subscriber identifiers (e.g. SID1, SID2) of the terminal device. In case the terminal device has multiple equipment identifiers, the record 312 may also store mappings between the subscriber identifiers and the equipment identifiers. For example, the record may store, per at least one equipment identifier, one or more subscriber identifiers linked to the equipment identifier. The mobility management node may share the equipment identifier(s) of the terminal device together with the subscriber identifier(s) in the message transmitted in block 304 and, in some embodiments, also the mapping between the subscriber identifier(s) and the equipment identifier(s). The mapping may indicate, for one or more or all shared subscriber identifiers an equipment identifier currently used by the respective subscriber identifier for an RRC connection. In an embodiment, the database 310 also stores an identifier of an access node currently serving at least some of the subscriber identifiers. For example, one access node may serve the first subscriber identifier while another access node may serve the second subscriber identifier, and the database may store the identifier(s) of the access node(s) serving the subscriber identifier(s) other than the first subscriber identifier. This information may also be shared to the target network node in block 304.

Referring to FIG. 4, the process in the target network node comprises: receiving (block 400), from a mobility management node, a message during setup of a bearer for a first subscriber identifier, the message comprising at least a second subscriber identifier different from the first subscriber identifier; storing (block 402) the first subscriber identifier and the second identifier; and performing (block 404) at least one procedure using the second identifier.

The target network node may maintain a similar identifier database 410 as the source network node and update the database 410 in step 402. As a result of the procedure of FIGS. 3 and 4, the record 412 of the terminal device in the database 410 is updated to have a higher correlation with the record 312 in the database 310. The record 412 may be updated with substantially the same information as in the record 312 by delivering the one or more subscriber identifiers of the terminal device to the target network node. The databases 310, 410 may still store different records because the network nodes serve different terminal devices.

In an embodiment, upon completing the setup of the bearer or upon delivering the other subscriber identifiers that are not subject to the bearer setup to the target network node, the mobility management node may still maintain the record 212 of the terminal device for later use. In case the bearer setup relates to a handover between the mobility management nodes 200, 202, the mobility management node operating as a source for the handover and executing the process of FIG. 3 may delete the record upon completing the process of FIG. 3. It may, however, maintain the record 312 for a certain period of time in preparation for a potential handover back to the source node 200, or until the target network node 202 indicates release of a context of the terminal device to the source node 200.

As described above, the second subscriber identifier is transferred from the mobility management node to the target network node during a bearer setup for the first subscriber identifier. In an embodiment, the second subscriber identifier has no bearer operational or being set up, and/or no handover procedure pending during transmission of the message (steps 304 and 400). The second subscriber identifier may be idle at this stage, or it may have an operational bearer.

The above-described embodiments enable the network nodes to share the information on multi-SIM (MUSIM) capability of the terminal device. As a result, the procedures using the MUSIM capability information may gain benefits immediately upon establishing a bearer for the terminal device, e.g. upon handing the terminal device over to the target network node. This cooperation provides an improvement to a solution where the network nodes would have to independently detect the MUSIM capability, and the improvement may be gained in terms of reduced signalling in radio interface and in the S1/NG interface, and improved performance in the procedures using the MUSIM capability information.

In an embodiment, the second subscriber identifier is associated with a RRC connection that is in an idle state (RRC_idle).

In an embodiment, the second subscriber identifier is associated with a RRC connection that is in an inactive state (RRC_inactive).

In an embodiment, the second subscriber identifier is associated with a RRC connection that is in a connected state (RRC_connected).

In some embodiments, the second subscriber identifier is linked to the substantially same equipment identifier as the first subscriber identifier. In other embodiments, the second subscriber identifier is linked to a different equipment identifier than the first subscriber identifier.

In an embodiment, the message transferred in blocks 304, 400 further comprises at least one equipment identifier of the terminal device. The message may also include information that maps at least one subscriber identifier of the terminal device to at least one equipment identifier.

In an embodiment, at least one further subscriber identifier of the terminal device is transmitted in block 304 and received in block 400. In an embodiment, some or all the subscriber identifiers of the terminal device that are known to the mobility management node are transferred to the target network node during the bearer setup.

In an embodiment, the first subscriber identifier and the second subscriber identifier are subscriber identifiers of substantially the same public land mobile network (PLMN). In another embodiment, the first subscriber identifier and the second subscriber identifier are subscriber identifiers of different public land mobile networks. Depending on the PLMN of the second subscriber identifier, the procedure executed in block 404 may be different. Some embodiments are described below.

In an embodiment, the message is transmitted and received over an S1 or NG interface or an S10 or NG14 interface, depending on the embodiment and configuration of the cellular communication system. LTE systems may employ the X2 interface while 5G networks may employ the Xn interface between the mobility management node and access nodes. In embodiments where the MUSIM information is transferred between the mobility management nodes, the interface may be an S10 or NG14 interface.

Figure 5:
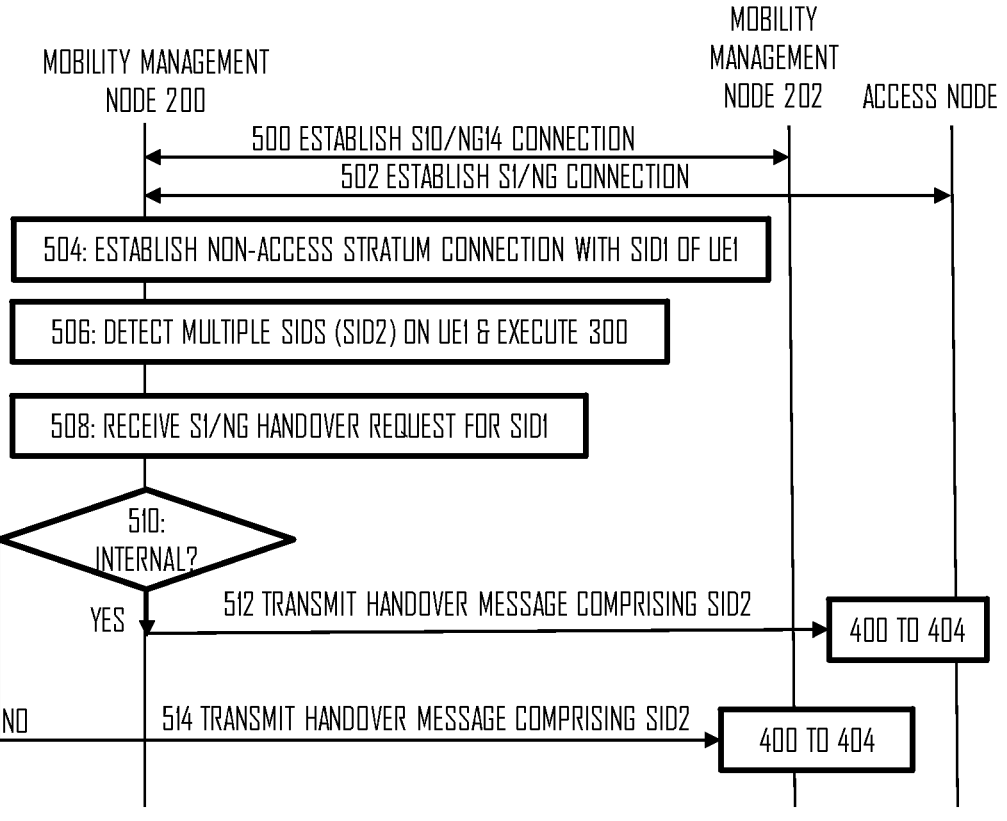
FIG. 5 illustrates a signalling diagram for sharing multiple subscriber identifiers of a terminal device between network nodes in connection with a handover.

In an embodiment, the bearer setup is a part of a handover of the first subscriber identifier from one access node to another access node wherein a handover of a non-access stratum connection is involved. In such an embodiment, the mobility management node may determine whether or not the handover of the non-access stratum is internal to the mobility management node and, on the basis of the determination, the mobility management node may select the target network node to which to transmit the MUSIM information. FIG. 5 illustrates a procedure according to this embodiment.

Referring to FIG. 5, the mobility management node 200 may establish a connection with the other mobility management node 202 via S10 or NG14 interface in step 500. This connection enables cooperation and communication between the mobility management nodes 200, 202. In step 502, the mobility management node 200 establishes an S1 or NG connection with an access node, e.g. the access nodes 104 and 104A. In block 504, the mobility management node 200 establishes a non-access stratum connection for the first subscriber identifier (SID1) of the terminal device 100 via the access node 104. During the connection, the mobility management node 200 may detect that the terminal device 100 has multiple subscriber identifiers and, as a consequence, executes block 300. The detection may be based on establishment of second non-access stratum connection with the second (or further) subscriber identifier of the terminal device. The detection that the two (or more) subscriber identifiers are associated with the substantially same terminal device may be based on establishing the multiple non-access stratum connections with different subscriber identifiers but the substantially same equipment identifier, for example. The mapping of the multiple subscriber identifiers to the substantially same terminal device may be carried out in another manner as well.

In block 508, the mobility management node receives a handover request from an access node 104 serving the first subscriber identifier. The handover request may be a request for handover of an S1/NG connection of the first subscriber identifier. Upon receiving the handover request, the mobility management node may determine in block 510 whether or not the S1/NG handover is internal to the mobility management node. The determination may be based on determining whether or not a target cell of the handover belongs to a target access node controlled by the mobility management node. If target access node is under the control of the mobility management node, the handover is internal, otherwise it is not. If the handover is internal, the process may proceed to step 512 where the mobility management node transmits to the target access node a handover message indicating the handover of the first subscriber identifier and further comprising at least the second subscriber identifier of the terminal device. In response to receiving the handover message comprising the further subscriber identifier(s), the target access node may perform blocks 400 to 404 and, then, the procedure may end with respect to the transfer of the MUSIM information. If the handover is not internal to the mobility management node, the process may proceed to step 514 where the mobility management node transmits a handover message to another mobility management node that is a target of the handover. Similarly, the handover message may indicate the handover of the first subscriber identifier and further comprise at least the second subscriber identifier of the terminal device. In response to receiving the handover message comprising the further subscriber identifier(s), the target mobility management node may perform blocks 400 to 404 and, then, the procedure may end with respect to the transfer of the MUSIM information.

Figure 6:
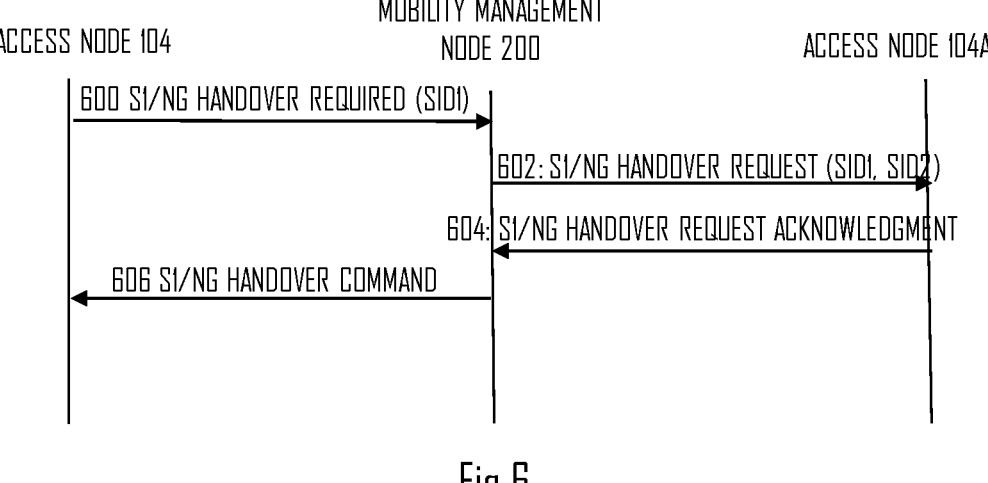
FIG. 6 illustrates an embodiment unsolicited sharing of multiple subscriber identifiers between network nodes.

In an embodiment, the handover request transferred in step 512 over the NG interface and carrying the subscriber identifiers has the following structure:

information) to the second network node in an unsolicited manner. In other words, the mobility management node may transmit the MUSIM information of the terminal device without knowledge of whether the target network node will utilize or even accept the MUSIM information. FIG. 6 illustrates such a procedure in the context of internal S1/NG handover. A similar unsolicited transfer of the MUSIM information may be carried out when the handover is between the mobility management nodes 200, 202.

```
HandoverRequest-IEs NGAP-PROTOCOL-IES ::= {
{ID id-AMF-UE-NGAP-ID              CRITICALITY  TYPE AMF-UE-                                PRESENCE
                                   reject       NGAP-ID                                     mandatory}|
{ ID id-HandoverType               CRITICALITY  TYPE                                        PRESENCE
                                   reject       HandoverType                                mandatory}|
{ID id-Cause                       CRITICALITY  TYPE Cause                                  PRESENCE
                                   ignore                                                   mandatory}|
{ID id-                            CRITICALITY  TYPE                                        PRESENCE
UEAggregateMaximumBitRate          reject       UEAggregateMaximumBitRate                   mandatory}|
{ID id-                            CRITICALITY  TYPE                                        PRESENCE
CoreNetworkAssistanceInformationForInactive  ignore  CoreNetworkAssistanceInformationForInactive  optional }|
{ ID id-                           CRITICALITY  TYPE                                        PRESENCE
UESecurityCapabilities             reject       UESecurityCapabilities                      mandatory}|
{ ID id-SecurityContext            CRITICALITY  TYPE                                        PRESENCE
                                   reject       SecurityContext                             mandatory}|
{ ID id-                           CRITICALITY  TYPE                                        PRESENCE
NewSecurityContextInd              reject       NewSecurityContextInd                       optional}|
{ ID id-NASC                       CRITICALITY  TYPE NAS-PDU                                PRESENCE
                                   reject                                                   optional }|
{ ID id-                           CRITICALITY  TYPE                                        PRESENCE
PDUSessionResourceSetupListHOReq   reject       PDUSessionResourceSetupListHOReq            mandatory}|
{ ID id-AllowedNSSAI               CRITICALITY  TYPE                                        PRESENCE
                                   reject       AllowedNSSAI                                mandatory}|
{ ID id-TraceActivation            CRITICALITY  TYPE                                        PRESENCE
                                   ignore       TraceActivation                             optional }|
{ ID id-MaskedIMEISV               CRITICALITY  TYPE                                        PRESENCE
                                   ignore       MaskedIMEISV                                optional }|
{ ID id-                           CRITICALITY  TYPE MUSIM-                                 PRESENCE
MUSIMMaskedIMEISV                  ignore       MaskedIMEISVList                            optional }|
{ ID id-SourceToTarget-            CRITICALITY  TYPE                                        PRESENCE
TransparentContainer               reject       SourceToTarget-                             mandatory}|
                                                TransparentContainer
{ ID id-                           CRITICALITY  TYPE                                        PRESENCE
MobilityRestrictionList            ignore       MobilityRestrictionList                     optional }|
{ ID id-                           CRITICALITY  TYPE                                        PRESENCE
LocationReportingRequestType       ignore       LocationReportingRequestType                optional }|
{ ID id-                           CRITICALITY  TYPE                                        PRESENCE
RRCInactiveTransitionReportRequest ignore       RRCInactiveTransitionReportRequest          optional }|
{ ID id-GUAMI                      CRITICALITY  TYPE GUAMI                                  PRESENCE
                                   reject                                                   mandatory}|
{ID id-                            CRITICALITY  TYPE                                        PRESENCE
RedirectionVoiceFallback           ignore       RedirectionVoiceFallback                    optional }|
{ ID id-                           CRITICALITY  TYPE                                        PRESENCE
CNAssistedRANTuning                ignore       CNAssistedRANTuning                         optional }|
{ ID id-                           CRITICALITY  TYPE                                        PRESENCE
SRVCCOperationPossible             ignore       SRVCCOperationPossible                      optional }|
...
}
MUSIM-MaskedIMEISVList ::= SEQUENCE {
    MaskedIMEISV                   BIT STRING (SIZE(64))
    }
```

In an embodiment, the information element MUSIM-MaskedIMEISVList comprises the second and optionally further subscriber identifier(s) of the terminal device. The information element may also carry other identifiers related to the subscriber identifiers, e.g. the one or more equipment identifiers such as IMEI or PEI. The target access node may employ this information in the various procedures when executing block 404. The handover request transferred in step 514 over the NG14 interface and carrying the subscriber identifiers may have a corresponding structure, although configured to the protocol of the different interface.

In an embodiment, the mobility management node transmits at least the second subscriber identifier (the MUSIM Referring to FIG. 6, the mobility management node 200 may receive a handover request from an access node 104 serving the first subscriber identifier (SID1) of the terminal device 100 to an access node 104A having no direct interface with the access node 104 (step 600). The handover request may be a S1/NG handover needed message specified in the 3GPP specifications. In response to the reception in step 600, the mobility management node 200 may transmit a handover request to the access node 104A in step 602. This handover request may indicate that the handover is for the first subscriber identifier and additionally include the MUSIM information, e.g. the second subscriber identifier (SID2) and/or further subscriber identifiers of the terminal device.

The handover request transferred in step 602 may be an S1/NG handover request. Upon receiving the handover request, the access node 104A may start preparations for the handover in a conventional manner and, additionally, store the second (and further) subscriber identifiers (step 402). If the access node 104A does not support the utilization of the MUSIM information, the access node 104A may discard the second (and further) subscriber identifiers. The access node 104A may respond to the handover request with a handover ment node 200 in block 700. The establishment may include the access node transmitting an S1/NG setup request to the mobility management node in step 702. The request may include at least one information element indicating to the mobility management node whether or not the access node accepts the MUSIM information. Table below illustrates an embodiment of the NG setup request

```
NGSetupRequest ::= SEQUENCE {
protocolIEs                 ProtocolIE-Container { {NGSetupRequestIEs} },
...
}
NGSetupRequestIEs NGAP-PROTOCOL-IES ::= {
```

| { ID id- GlobalRANNodeID | CRITICALITY reject | TYPE GlobalRANNodeID | PRESENCE mandatory}\| |
|---|---|---|---|
| { ID id-RANNodeName | CRITICALITY ignore | TYPE RANNodeName | PRESENCE optional}\| |
| { ID id- SupportedTAList | CRITICALITY reject | TYPE SupportedTAList | PRESENCE mandatory}\| |
| { ID id- DefaultPagingDRX | CRITICALITY ignore | TYPE PagingDRX | PRESENCE mandatory}\| |
| { ID id- UERetentionInformation | CRITICALITY ignore | TYPE UERetentionInformation | PRESENCE optional }, |
| { ID id- MUSimCapabilityInfo | OCTET STRING | | PRESENCE OPTIONAL}, |

```
...
}
MUSIM-MaskedIMEISVList ::= SEQUENCE {
MaskedIMEISV                BIT STRING (SIZE(64))
}
``` request acknowledgment message in step 604. The acknowledgment may indicate that the access node 104A is ready for the handover. In step 606, the mobility management node may then issue an S1/NG handover command to the access node, thus triggering execution of the handover.

Figure 7:
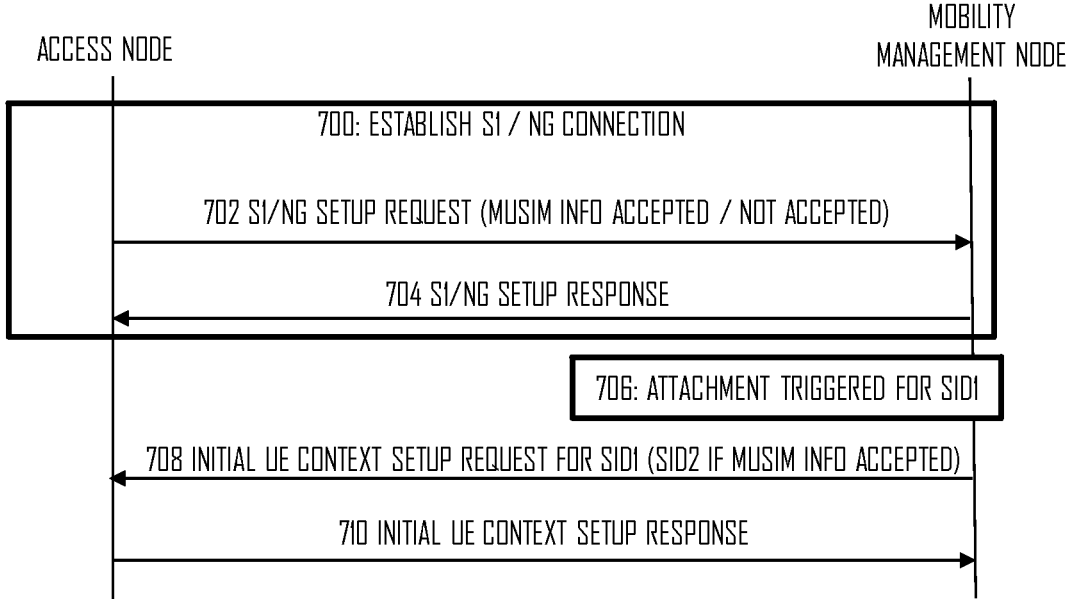
FIGS. 7 and 8 illustrate embodiments for solicited sharing of multiple subscriber identifiers between network nodes.
Figure 8:
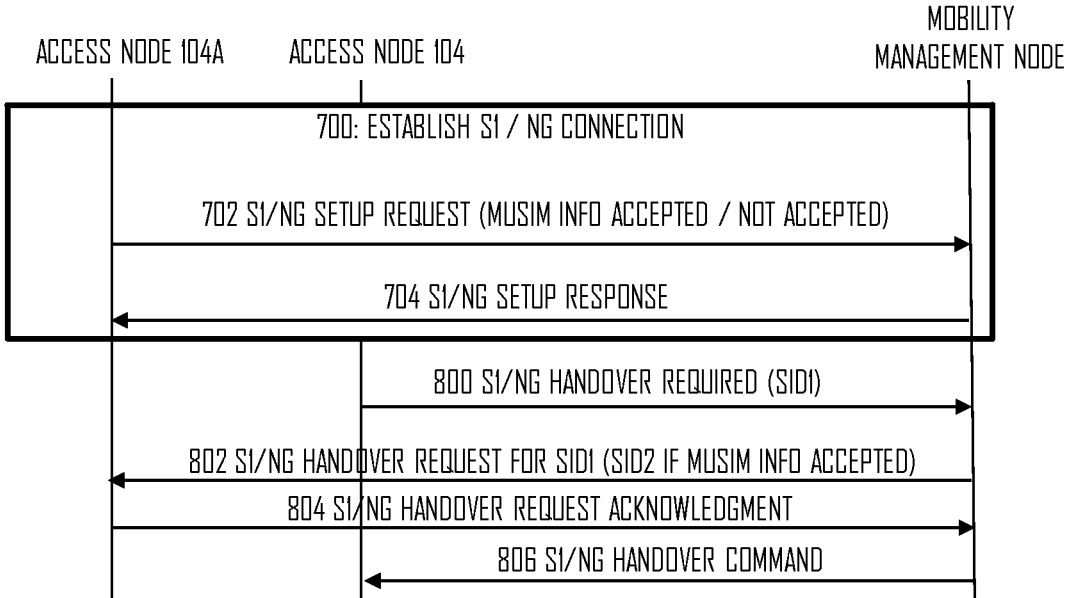

In another embodiment, the mobility management node transmits at least the second subscriber identifier (the MUSIM information) to the second network node in a solicited manner. In such embodiments, the mobility management node and the target network node may first negotiate of the transfer of the MUSIM information of the terminal devices where the nodes agree on whether or not to share the MUSIM information. If it is agreed that the target network node will accept the MUSIM information, the mobility management node may be configured to share the MUSIM information in connection with a bearer setup for terminal devices having multiple subscriber identifiers. On the other hand, if it is agreed that the target network node will not accept the MUSIM information, the mobility management node may be configured to not share the MUSIM information, if such is available to a certain terminal device. FIGS. 7 and 8 illustrate such embodiments. FIG. 7 illustrates an embodiment where the bearer setup is for establishment of a new connection for the first subscriber identifier, while FIG. 8 illustrates a procedure where the bearer setup is for a handover of the first subscriber identifier and where at least a new radio bearer is established for the first subscriber identifier between the terminal device and the target access node 104A.

Referring to FIG. 7, an access node 104 or 104A establishes an S1 or NG connection with the mobility manage- Upon receiving the setup request, the mobility management node may store the information on whether or not the access node accepts the MUSIM information and responds to the setup request with an S1/NG setup response message in step 704. Let us at this stage assume that the mobility management node has acquired the information that the terminal device 100 has multiple subscriber identifiers SID1 and SID2 (and further). Upon triggering an attachment procedure for SID1 in block 706, e.g. upon receiving a non-access stratum attach request for the SID1 from the terminal device, the mobility management node may check whether or not the access node delivering the attach request accepts the MUSIM information. If the access node accepts the MUSIM information, the mobility management node may transmit (step 708) to the access node an initial UE context setup request for SID1, wherein the request includes the MUSIM information (at least SID2). Upon receiving the request, the access node may then carry out block 402 and store the MUSIM information. On the other hand, if the access node does not accept the MUSIM information, the mobility management node may transmit to the access node an initial UE context setup request for SID1 without the MUSIM information. In both cases, the access node may respond to the request with an initial UE context setup response message in step 710, as specified in the 3GPP specifications.

In an embodiment, the initial UE context setup request transferred in step 708 and including the MUSIM information may have the following structure.

```
InitialContextSetupRequest ::= SEQUENCE {
protocolIEs ProtocolIE-Container { {InitialContextSetupRequestIEs} },
...
}
InitialContextSetupRequestIEs NGAP-PROTOCOL-IES ::= {
{ ID id-AMF-UE-NGAP-ID              CRITICALITY  TYPE AMF-UE-NGAP-ID                    PRESENCE
                                    reject                                             mandatory }|
{ ID id-RAN-UE-NGAP-ID              CRITICALITY  TYPE RAN-UE-NGAP-ID                    PRESENCE
                                    reject                                             mandatory }|
{ ID id-OldAMF                      CRITICALITY  TYPE AMFName                           PRESENCE
                                    reject                                             optional }|
{ ID id-                           CRITICALITY  TYPE                                  PRESENCE
UEAggregateMaximumBitRate           reject       UEAggregateMaximumBitRate             conditional }|
{ ID id-                           CRITICALITY  TYPE                                  PRESENCE
RRCInactiveAssistanceInformation    ignore       RRCInactiveAssistanceInformation      optional }|
{ ID id-GUAMI                       CRITICALITY  TYPE GUAMI                             PRESENCE
                                    reject                                             mandatory }|
{ ID id-                           CRITICALITY  TYPE                                  PRESENCE
PDUSessionResourceSetupListCxtReq   reject       PDUSessionResourceSetupListCxtReq     optional }|
{ ID id-AllowedNSSAI                CRITICALITY  TYPE AllowedNSSAI                      PRESENCE
                                    ignore                                             mandatory }|
{ ID id-                           CRITICALITY  TYPE                                  PRESENCE
UESecurityCapabilities              reject       UESecurityCapabilities                mandatory }|
{ ID id-SecurityKey                 CRITICALITY  TYPE SecurityKey                       PRESENCE
                                    reject                                             mandatory }|
{ ID id-                           CRITICALITY  TYPE                                  PRESENCE
TraceActivation                     ignore       TraceActivation                       optional }|
{ ID id-                           CRITICALITY  TYPE                                  PRESENCE
MobilityRestrictionList             ignore       MobilityRestrictionList               optional }|
{ ID id-                           CRITICALITY  TYPE                                  PRESENCE
UERadioCapability                   ignore       UERadioCapability                     optional }|
{ ID id-IndexToRFSP                 CRITICALITY  TYPE IndexToRFSP                       PRESENCE
                                    ignore                                             optional }|
{ ID id-MaskedIMEISV                CRITICALITY  TYPE MaskedIMEISV                      PRESENCE
                                    ignore                                             optional }|
  { ID id-                         CRITICALITY  TYPE MUSIM-                            PRESENCE
MUSIMMaskedIMEISV                   ignore       MaskedIMEISVList                       optional }|
{ ID id-NAS-PDU                     CRITICALITY  TYPE NAS-PDU                           PRESENCE
                                    ignore                                             optional }|
{ ID id-                           CRITICALITY  TYPE                                  PRESENCE
EmergencyFallbackIndicator          reject       EmergencyFallbackIndicator            optional },
...
}
MUSIM-MaskedIMEISVList ::= SEQUENCE {
MaskedIMEISV                        BIT STRING (SIZE(64))
}
```

40

Again, the information element MUSIM-Masked-IMEISVList may carry the MUSIM information, e.g. the additional subscriber identifier(s) of the terminal device.

In FIG. 8, the same reference numbers as in FIG. 7 represent the same or substantially similar steps, functions, or operations. Referring to FIG. 8, the S1/NG connection may be established in the above-described manner, including the handshake in steps 702 and 704 to share the information on the acceptance of the MUSIM information. The establishment may be carried out between the mobility management node 200 and at least the access node 104A that is the target access node. A similar procedure may be carried out between the mobility management node 200 and the access node 104 for the purpose of setting up bearers for terminal devices through the access node 104.

In step 800, the access node 104 may transmit the handover request to the mobility management node, requesting for S1/NG handover for the SID1. The handover request may be a S1/NG handover needed message, indicating SID1 and the target access node 104A. Upon receiving the handover request in step 800, the mobility management node may check whether or not the access node 104A that is the target of the handover accepts the MUSIM information. If the access node 104A accepts the MUSIM information, the mobility management node may transmit (step 802) to the access node 104A a handover request indicating a handover for SID1, wherein the handover request includes the MUSIM information (at least SID2). Upon receiving the request, the access node 104A may then carry out block 402 and store the MUSIM information. On the other hand, if the access node 104A does not accept the MUSIM information, the mobility management node may transmit to the access node the handover request for SID1 without the MUSIM information. In both cases, the access node may respond to the request with an S1/NG handover request acknowledgment message in step 804, as specified in the 3GPP specifications. This may indicate to the mobility management node that the access node 104A is ready for the handover and, as a consequence, the mobility management node may trigger the handover by transmitting a handover command to the source access node 104 in step 806.

Figures 9, 10:
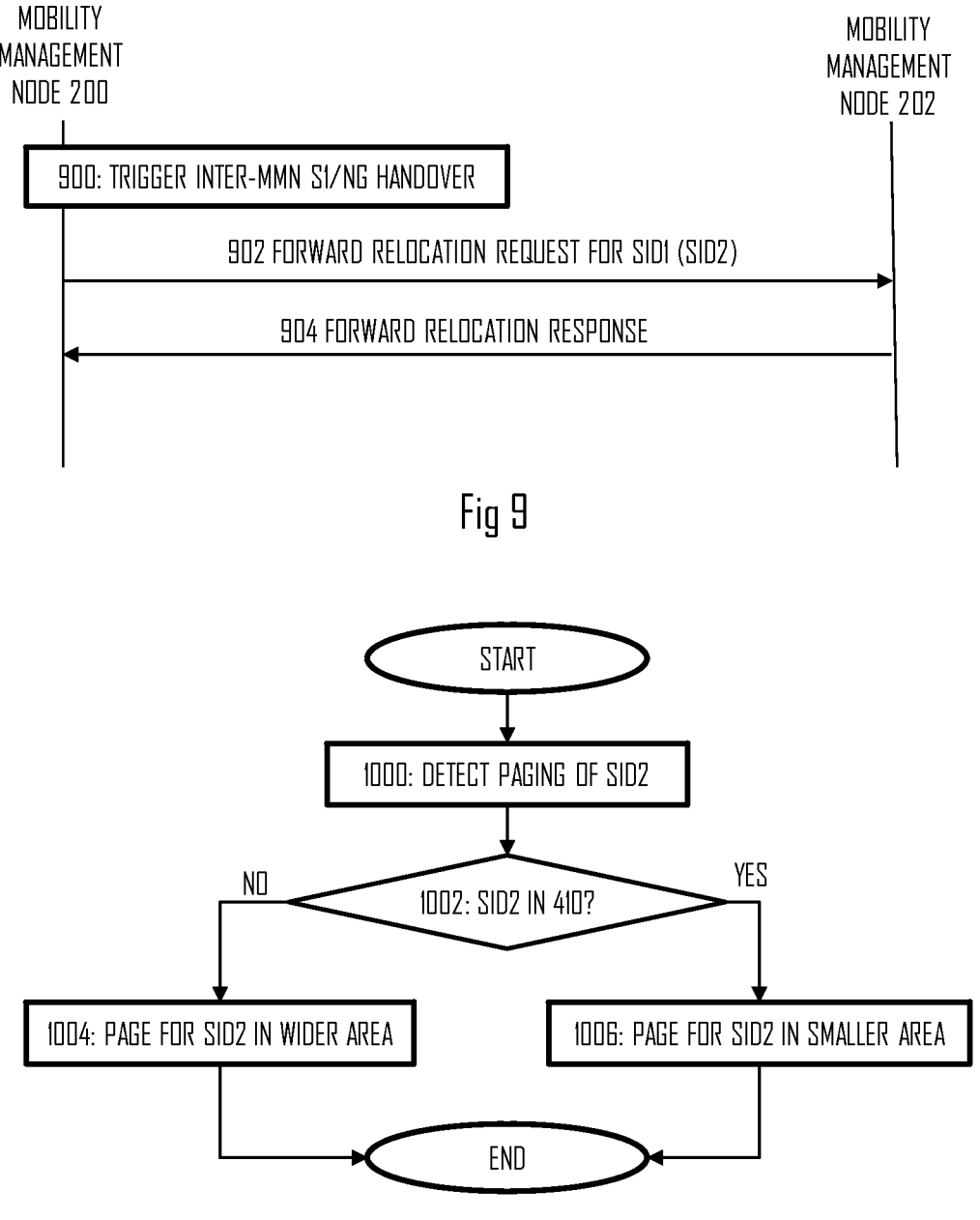
FIG. 9 illustrates an embodiment of a procedure for sharing multiple subscriber identifiers between mobility management nodes.
FIG. 10 illustrates an embodiment of a procedure for performing optimization by using the information on multiple subscriber identifiers for a terminal device.

FIG. 9 illustrates an embodiment for sharing the MUSIM information between the mobility management nodes 200, 202 in connection with inter-mobility-management-node handover of the first subscriber identifier. When the S1/NG handover is triggered by the mobility management node 200 in block 900, the mobility management node 200 may transmit to the mobility management node 202 that is the target network node a relocation request (step 902) for relocating the non-access stratum connection of the first subscriber identifier SID1 to the mobility management node 202. The relocation request may be a forward relocation request specified in the 3GPP specifications, for example. The relocation request may comprise the second subscriber identifier and, optionally, further subscriber identifiers of the terminal device of SID1, similar to the other embodiments described herein. Upon receiving the relocation request in step 902, the mobility management node 202 may carry out block 402 and store the MUSIM information. According to the protocol, the mobility management node 202 may respond to the relocation request by transmitting a relocation response in step 904 to confirm the relocation of the connection of SID1. FIG. 9 illustrates the unsolicited transmission of the MUSIM information but, in embodiments using the solicited transmission of the MUSIM information, a procedure similar to that of steps 702 and 704 may be carried out between the mobility management nodes.

Let us then describe some embodiments of block 404 with reference to FIG. 10. In an embodiment, the procedure using the second subscriber identifier delivered in the handover message is a paging procedure for the second subscriber identifier, and the target network node reduces a paging area by using the second subscriber identifier. Conventionally, a preset paging area is defined for paging a certain subscriber identifier. The preset paging area may be a tracking area comprising a certain number of cells and/or certain number of access nodes that page for the subscriber identifier. Now that the network node has linked the second subscriber identifier with the first subscriber identifier that was handed over to the network node or for which the bearer was set up, as described above, the network node may map the location of the second subscriber identifier to a location of the first subscriber identifier by using the mapping and, with the more accurate positioning of the second subscriber identifier, the network node may reduce the paging area smaller than the tracking area. For example, the paging area may be reduced to an area covering the cell to which the first subscriber identifier was handed over or where the bearer was set up and, optionally, to cells neighbouring the cell. FIG. 10 illustrates such an embodiment.

Referring to FIG. 10, upon receiving a paging message paging for the second subscriber identifier (SID2) in block 1000, the network node may first determine whether or not the second subscriber identifier is currently served by the network node. If the second subscriber identifier is served by the network node, the network node may page for the terminal device in a control area of the network node, e.g. in a cell where the second subscriber identifier is determined to be located or in a group of cells. However, if the second subscriber identifier is not currently served by the network node, e.g. the second subscriber identifier is currently operating in an RRC idle state, the network node may check in block 1002 the database 410 for whether the second subscriber identifier is mapped there to a subscriber identifier that is currently served by the network node (SID1). Upon detecting that the second subscriber identifier is linked to a subscriber identifier served by the network node, the network node may use the location of such a subscriber identifier as a location of the second subscriber identifier and reduce the paging area to that location or area in block 1006. Upon detecting no mapping with another subscriber identifier served by the network node, the network node may page for the second subscriber identifier in the larger, default paging area in block 1004. The network node may be the access node or the mobility management node, as described above.

In an embodiment, the mapping between the first subscriber identifier and the second subscriber identifier in the database 410 is used to position the second subscriber identifier for another purpose than paging. The cellular communication systems use positioning for various purposes, and the embodiments enable using the mapping to position, for example, a subscriber identifier that is currently idle. One purpose of the positioning is location-based services provided as applications to a user of the terminal device. Another purpose is positioning of the terminal device and the second subscriber identifier for the purposes of a police or another authority.

Figures 11, 12:
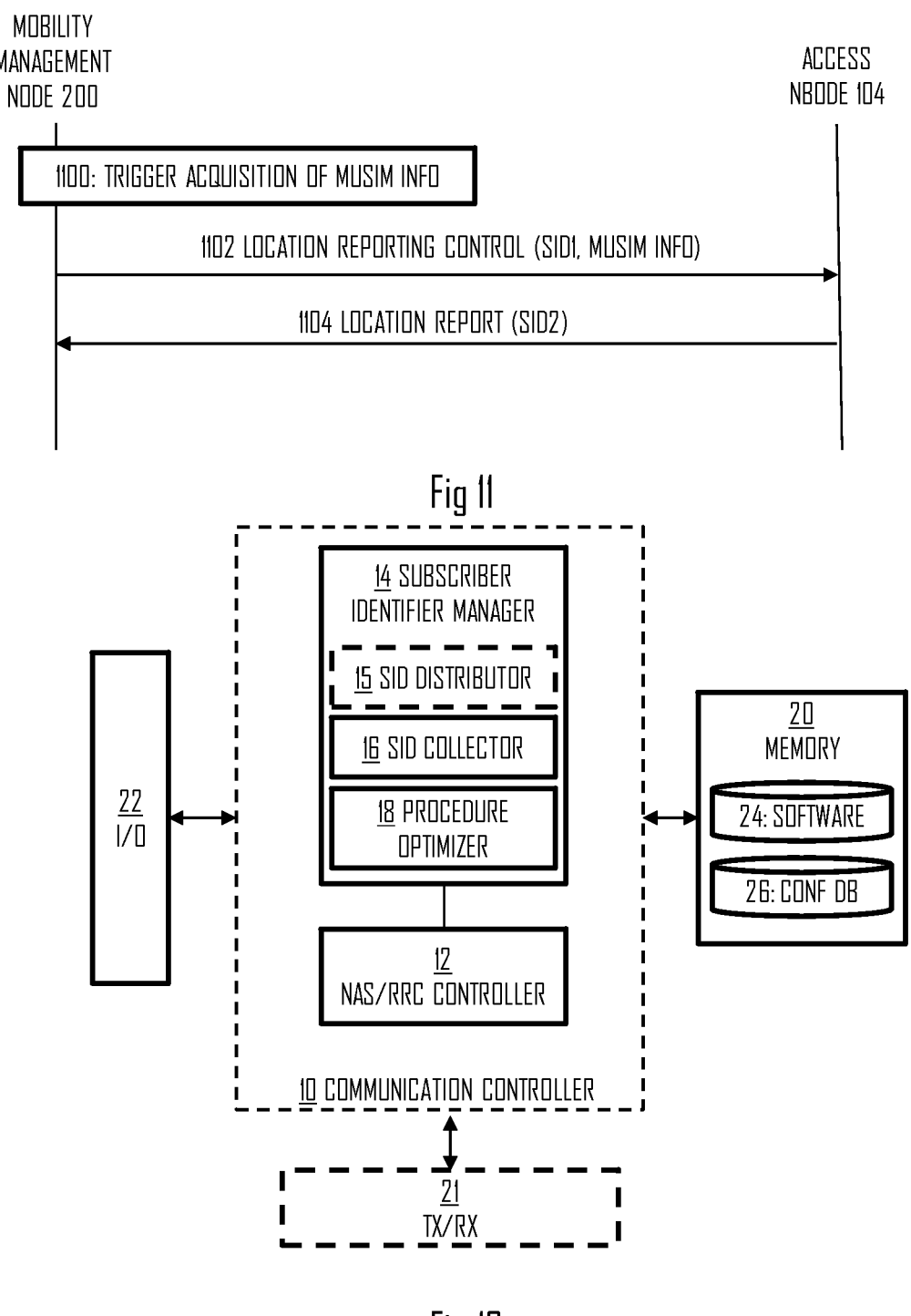
FIG. 11 illustrates a procedure for a mobility management node to acquire information on multiple subscriber identifiers of a terminal device from an access node.
FIG. 12 illustrates a block diagram of a structure of an apparatus according to an embodiment of the invention.

FIG. 11 illustrates yet another embodiment for sharing the MUSIM information between the mobility management node and the access node controlled by the mobility management node. In particular, the procedure of FIG. 11 illustrates an embodiment of a method for the mobility management node to acquire the MUSIM information of a terminal device from an access node. Referring to FIG. 11, upon triggering acquisition of MUSIM information for a given terminal device having the first subscriber identifier SID1 known to the mobility management node, the mobility management node may transmit a location reporting control message to the access node currently known to serve the SID1. The location reporting control message may comprise an information element indicating that the mobility management node accepts or requests for the MUSIM information. Table below indicates an embodiment of the location reporting control message as modified from a location reporting control message specified in the 3GPP specifications for 5G.

```
LocationReportingControl ::= SEQUENCE {
protocolIEs ProtocolIE-Container              { {LocationReportingControlIEs} },
...
}
LocationReportingControlIEs NGAP-PROTOCOL-IES ::= {
{ ID id-AMF-UE-NGAP-ID        CRITICALITY  TYPE AMF-UE-NGAP-ID      PRESENCE
                              reject                                mandatory}|
{ ID id-RAN-UE-NGAP-ID        CRITICALITY  TYPE RAN-UE-NGAP-ID      PRESENCE
                              reject                                mandatory}|
{ ID id-                      CRITICALITY  TYPE                     PRESENCE
LocationReportingRequestType  ignore       LocationReportingRequestType  mandatory},
{ ID id-                      CRITICALITY  TYPE OCTET STRING         PRESENCE
MUSimCapabilityInfo           ignore                                mandatory},
...
}

MUSIM-MaskedIMEISVList ::= SEQUENCE {
MaskedIMEISV                  BIT STRING (SIZE(64))
}
```

The information element indicating that the mobility management node accepts or requests for the MUSIM information is the MUSimCapabilityInfo. Upon receiving the location reporting control message indicating SID1 and the request/acceptance of the MUSIM information, the access node may check its database for further subscriber identifiers mapped to SID2, e.g. SID2, and transmit such subscriber identifier(s) to the mobility management node in a location report message in step 1104. In this manner, the subscriber identifiers even in an RRC idle state such as SID2 may be transferred as the MUSIM information to the mobility management node.

FIG. 12 illustrates an embodiment of a structure of the above-mentioned functionalities of an apparatus executing the functions of the target network node that receives the MUSIM information and uses it to improve one or more procedures with the MUSIM information in the embodiments described above, e.g. the process of FIG. 4 or any one of embodiments thereof. As described above, the apparatus for the access node or for the mobility management node. In an embodiment, the apparatus may be a circuitry or an electronic device realizing some embodiments of the invention in such a network node. The apparatus carrying out the above-described functionalities may thus be comprised in such a device, e.g. the apparatus may comprise a circuitry such as a chip, a chipset, a processor, a micro controller, or a combination of such circuitries for the network node.

Referring to FIG. 12, the apparatus may comprise a communication controller 10 providing the apparatus with capability of performing the above-described functions of the network node. Depending on whether the apparatus is for the access node or for the mobility management node, the functions and configurations of the communication controller may be different. In some embodiments, e.g. when the apparatus comprises or is for the access node, the apparatus may comprise a radio interface 21 providing the apparatus with radio communication capability, and the communication controller 10 may employ the radio interface 21. The radio interface 21 may enable wireless communications with terminal devices served by the access node. The radio interface 21 may comprise multiple antennas and associated analogue components needed for transmitting and receiving radio signals, e.g. an amplifier, filter, frequency-converter, and an analogue-to-digital converter. The communication controller 10 and/or the radio interface 21 may comprise a radio modem configured to carry out transmission and reception of messages in one or more cells controlled by the network node. In some embodiments, the radio interface 21 is used for communicating with the other network nodes, e.g. wireless X2 or Xn interface. Embodiments where the apparatus is for the mobility management node in the core network, the radio interface 21 may be omitted.

In some embodiments, the apparatus comprises a second communication interface 22 configured to provide the apparatus with capability of communicating with other network nodes, e.g. with network nodes of the core network 110 and/or with access nodes of the cellular communication system. In some embodiments, the communication interface 22 may also be used to communicate with the network nodes of other PLMNs via wired connections. In the context of 5G networks, the communication interface 22 may be configured to communication over an NG and/or NG14 interface.

The communication controller 10 may comprise at least one processor or a processing circuitry. The apparatus may further comprise a memory 20 storing one or more computer program products 24 configuring the operation of said processor(s) of the apparatus. The memory 20 may be implemented using any suitable data storage technology, such as semiconductor-based memory devices, flash memory, magnetic memory devices and systems, optical memory devices and systems, fixed memory and removable memory. The memory 20 may further store a configuration database 26 storing operational configurations of the apparatus. The configuration database 26 may, for example, store the rules for optimizing the procedures described above in connection with block 404 upon having the MUSIM capability information available. The memory 20 may further store the database 310/410 storing the MUSIM information, e.g. the multiple subscriber identifiers mapped to substantially the same terminal device.

The communication controller 10 may comprise, as submodules or sub-circuitries, a subscriber identifier manager 14 and a NAS/RRC controller 12. In the embodiments where the apparatus is for the access node, the controller 12 may be the RRC controller managing the RRC connections in one or more cells controlled by the access node. In embodiments where the apparatus is for the mobility management node, the controller 12 may be the NAS controller managing the non-access stratum (NAS) connections. The controller 12 may also carry out handover procedures for handing over terminal devices between network nodes, as described above. The subscriber identifier manager 14 may cooperate with other network nodes in sharing the information on the multiple subscriber identifiers of individual terminal devices served by the apparatus. For example, the subscriber identifier manager 14 may comprise a SID distributor 16 configured to perform the process of FIG. 3 or any one of its embodiments when establishing a bearer for a terminal device with multiple subscriber identifiers. The SID distributor may be comprised in the mobility management node, as described in several embodiments above, and it can also be comprised in the embodiments where the access node implements the sharing, e.g. the procedure of FIG. 11. The subscriber identifier manager 14 perform the process of FIG. 4 or any one of its embodiments when receiving a handover of or establishing a bearer for a terminal device with multiple subscriber identifiers.

The subscriber identifier manager 14 may comprise a subscriber identifier (SID) collector 16 configured to manage the database 410 or 310, depending on the embodiment. For example, upon receiving the handover message comprising the information element indicating multiple subscriber identifiers for a terminal device being handed over, the subscriber identifier collector 16 may extract the multiple subscriber identifiers from the handover message and update the database 410 in the above-described manner. The subscriber identifier manager 14 or the communication controller 10 in general may further comprise a procedure optimizer 18 that selects parameters for a procedure such as paging or positioning of a terminal device on the basis of whether the database 410 stores the multiple subscriber identifiers for a terminal device. The parameters may define, for example, a reduced paging area for a subscriber identifier that is linked to another subscriber identifier in the database 410, as described above.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions;

and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 3 to 11 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable not just to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

What is claimed is:

1. An apparatus for a mobility management node that is an access and mobility management function (AMF) in a 5G system controlling a plurality of access nodes, the apparatus comprising:

at least one processor; and at least one memory including computer program code, wherein the at least one memory and the computer program code are configured, with the at least one processor, to cause the apparatus to:

store a record for a terminal device in a subscriber identifier database maintained by the AMF, the record comprising at least two subscriber identifiers, the at least two subscriber identifiers comprising a first subscriber identifier and a second subscriber identifier, wherein the second subscriber identifier is associated with a radio resource control (RRC) connection in an idle state, an inactive state, or a connected state, and wherein the record further stores (i) an equipment identifier for the terminal device, and (ii) an identifier of an access node currently serving the second subscriber identifier;

receive, from an access node of the plurality of access nodes, over an NG interface using NGAP, a handover required message requesting a handover procedure for the first subscriber identifier that is internal to the AMF;

receive, from a target network node that is under control of the AMF and before a setup of a bearer for the first subscriber identifier has been initiated, a setup message comprising at least one information element indicating that the target network node accepts information on multiple subscriber identifiers; and based on the handover required request message and the setup message, transmit, to the target network node during the setup of the bearer as part of the handover procedure, a further handover request message to the target network node, the further handover request message comprising:

the second subscriber identifier encoded in an information element;

at least one equipment identifier for the terminal device, the equipment identifier being included together with the information element in the handover request message; and a data structure defining a mapping of the first subscriber identifier and the second subscriber identifier to the at least one equipment identifier, the mapping indicating which equipment identifier is currently used by each subscriber identifier and an identifier of an access node serving the second subscriber identifier.

2. The apparatus of claim 1, wherein the access node is a first access node controlled by the apparatus and the target network node is a second access node controlled by the apparatus.

3. The apparatus of claim 2, wherein the mobility management node is a first mobility management node, and wherein the target network node is a second mobility management node different from the first mobility management node.

4. An apparatus for a network node comprising:

at least one processor; and at least one memory including computer program code, wherein the at least one memory and the computer program code are configured, with the at least one processor, to cause the apparatus to:

transmit, to a mobility management node before a setup of a bearer has been initiated, a setup message comprising an information element indicating that the apparatus accepts information on multiple subscriber identifiers;

based on the setup message, receive, by the network node from the mobility management node controlling a plurality of access nodes, a handover message during the setup of the bearer for a first subscriber identifier, the handover message comprising at least a second subscriber identifier different from the first subscriber identifier, at least one equipment identifier, and a data structure defining a mapping of the first subscriber identifier and the second subscriber identifier to the at least one equipment identifier, wherein the second subscriber identifier is associated with a radio resource control (RRC) connection in an idle state, an inactive state, or a connected state;

store, by the network node, the first subscriber identifier, the second subscriber identifier, the at least one equipment identifier, and the data structure; and perform, by the network node, at least one procedure using the second subscriber identifier, wherein the at least one procedure is a paging procedure, and wherein performing the paging procedure comprises reducing a paging area for the second subscriber identifier based on a location associated with the first subscriber identifier.

5. The apparatus of claim 4, wherein the network node is an access node, and wherein the at least one memory and the computer program code are configured, with the at least one processor, to cause the apparatus to setup the bearer between the access node and the mobility management node.

6. The apparatus of claim 5, wherein the mobility management node is a first mobility management node and the network node is a second mobility management node different from the first mobility management node, and wherein the at least one memory and the computer program code are configured, with the at least one processor, to cause the apparatus to setup the bearer between the second mobility management node and an access node controlled by the second mobility management node.

7. A method comprising:

storing, in a mobility management node a record for a terminal device in a subscriber identifier database maintained by an access and mobility management function (AMF), the record comprising at least two subscriber identifiers, the at least two subscriber identifiers comprising a first subscriber identifier and a second subscriber identifier, wherein the second subscriber identifier is associated with a radio resource control (RRC) connection in an idle state, an inactive state, or a connected state, and wherein the record further stores (i) an equipment identifier for the terminal device, and (ii) an identifier of an access node currently serving the second subscriber identifier;

receiving, from an access node of a plurality of access nodes, over an NG interface using NGAP, a handover required message requesting a handover procedure for the first subscriber identifier that is internal to the AMF;

receiving, from a target network node that is under control of the AMF and before a setup of a bearer for the first subscriber identifier has been initiated, a setup message comprising at least one information element indicating that the target network node accepts information on multiple subscriber identifiers; and based on the handover request message and the setup message, transmitting, by the mobility management node to the target network node during the setup of the bearer as part of the handover procedure, a further handover request message comprising:

the second subscriber identifier encoded in an information element;

at least one equipment identifier for the terminal device, the equipment identifier being included together with the information element in the handover request message; and a data structure defining a mapping of the first subscriber identifier and the second subscriber identifier to the at least one equipment identifier, the mapping indicating which equipment identifier is currently used by each subscriber identifier and an identifier of an access node serving the second subscriber identifier.

8. A method comprising:

transmitting, by an apparatus to a mobility management node before setup of a bearer has been initiated, a setup message comprising an information element indicating that the apparatus accepts information on multiple subscriber identifiers;

based on the setup message, receiving, by a network node from the mobility management node controlling a plurality of access nodes, a handover message during the setup of the bearer for a first subscriber identifier, the handover message comprising at least a second subscriber identifier different from the first subscriber identifier, at least one equipment identifier, and a data structure defining a mapping the first subscriber identifier and the second subscriber identifier to the at least one equipment identifier, wherein the second subscriber identifier is associated with a radio resource control (RRC) connection in an idle state, an inactive state, or a connected state;

storing, by the network node, the first subscriber identifier, the second subscriber identifier, the at least one equipment identifier, and the data structure; and performing, by the network node, at least one procedure using the second subscriber identifier, wherein the at least one procedure is a paging procedure, and wherein performing the paging procedure comprises reducing a paging area for the second subscriber identifier based on a location associated with the first subscriber identifier.

* * * * *